2,838,541

6-FLUORO-4-PREGNENES AND PROCESS FOR PREPARING SAME

Barney J. Magerlein, Kalamazoo, and George B. Spero, William P. Schneider, and John A. Hogg, Kalamazoo Township, Kalamazoo County, Mich., assignors to The Upjohn Company, Kalamazoo, Mich., a corporation of Michigan No Drawing. Application November 29, 1957
Serial No. 699,527

22 Claims. (Cl. 260—397.45)

This invention relates to 6-fluoro-11β,17α-dihydroxy-4-pregnene-3,20-dione and 6-fluoro-17α-hydroxy-4-pregnene-3,11,20-trione and is more particularly concerned with 6α-fluoro-11β,17α-dihydroxy-4-pregnene-3, 20-dione, 6α-fluoro-17α-hydroxy-4-pregnene-3,11,20-trione, intermediates in the preparation of such compounds, and to processes for the production thereof.

The compounds of this invention, 6-fluoro-11β,17α-dihydroxy-4-pregnene-3,20-dione and 6-fluoro-17α-hydroxy-4-pregnene-3,11,20-trione, possess valuable anti-rheumatoid arthritic, anti-inflammatory and glucocorticoid activities in marked degree. Thus, for example, 6α-fluoro-11β,17α-dihydroxy-4-pregnene-3,20-dione has been found to exhibit 2.1 times the glucocorticoid activity of hydrocortisone, 3.1 times the anti-inflammatory activity of hydrocortisone, and in mineralocorticoid tests to induce sodium excretion 1.4 times the water loss 1.6 times the normal rate. These compounds are useful in the treatment of inflammatory conditions of the skin, eyes and ears of humans and of valuable domestic animals, as well as contact dermatitis and other allergic reactions. Administration of the novel steroids can be in conventional dosage forms, such as pills, tablets, capsules, syrups or elixirs for oral use, or in liquid forms which are adaptable to the natural and synthetic cortical steroid hormones for injectable products. The novel compounds can also be administered topically in the form of ointments, creams, lotions and the like, with or without coacting antibiotics, germicides or other materials forming advantageous combinations therewith. As will hereinafter be described in greater detail, these compounds are additionally useful as intermediates in the production of 6-fluoro-9α-halo - 11β,17α - dihydroxy - 4 - pregnene-3,20-dione and 6 - fluoro - 9α - halo - 17α-hydroxy-4-pregnene-3,11,20-trione. The 9α-halo derivatives are of particular importance because they possess a combination of high anti-inflammatory and glucocorticoid properties with low concomitant mineral corticoid activities.

The compounds of this invention can be prepared in accordance with the following reactions:

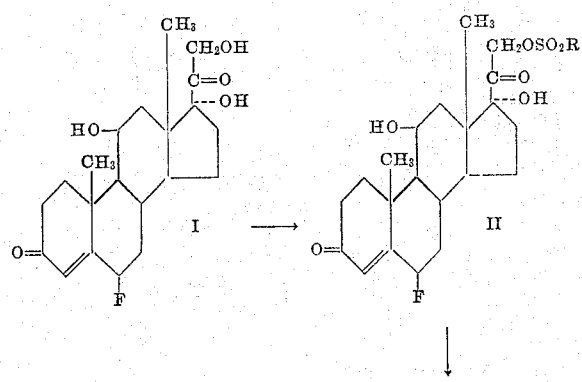

wherein R is an organic radical, particularly a hydrocarbon radical containing from one to ten carbon atoms, inclusive, such as methyl, ethyl, phenyl, tolyl, naphthyl, or the like, methyl being preferred. The steps illustrated above for the preparation of compounds I through IV can be designated broadly as comprising a process of 21-deoxygenation of the starting steroid.

In accordance with the present invention, 6-fluoro-11β,17α,21 - trihydroxy-4-pregnene-3,20-dione (6-fluorohydrocortisone) (I) is treated with an organic sulfonyl halide to obtain the corresponding 21-ester (II), a 21-alkyl or aryl sulfonate of 6-fluoro-11β,17α,21-trihydroxy-4-pregnene-3,20-dione. The said 21-alkyl or aryl sulfonate is next reacted with an iodinating agent to obtain the corresponding 21-iodo steroid (III), which is dehalogenated with a reducing agent to produce 6-fluoro-11β,17α-dihydroxy-4-pregnene-3,20-dione (IV). If desired, the 6-fluoro-21-desoxy product above can be oxidized to give 6-fluoro-17α-hydroxy-4-pregnene-3,11,20-trione (V). Alternatively, the 11-keto analogue of the starting material may be employed to yield the product (V), eliminating the oxidation step.

The starting steroids for the compounds and process of the present invention are 6-fluoro-11β,17α,21-trihydroxy-4-pregnene-3,20-dione or 6-fluoro-17α,21-dihydroxy-4-pregnene-3,11,20-trione and are prepared in accordance with the procedures of Preparations 1 through 11 herein. The preferred intermediate compounds containing the 17(20)-double bond have the cis configuration, because the cis isomers can ultimately be converted in higher yields in the oxidative hydroxylation step than is ordinarily possible with the trans isomer. It should be understood, however, that the trans isomer or mixtures of the cis and trans isomers are operative.

In carrying out the process of this invention, 6-fluorohydrocortisone (I) is treated with an organic sulfonyl halide such as methanesulfonyl chloride, toluenesulfonyl chloride, toluenesulfonyl bromide, benzenesulfonyl chloride, naphthylsulfonyl chloride, or the like, the methanesulfonic acid halides, especially methanesulfonyl chloride, being preferred. In the preferred embodiment of this invention, the starting steroid is reacted with the alkyl or aryl sulfonyl halide in solution in a solvent such as pyridine, benzene, toluene, or the like. Where such solvents as benzene and toluene are employed, an amount of amine base such as pyridine at least equal to the molar amount of the sulfonyl halide should also be present to react with the halogen acid formed. Reaction of the alkyl or aryl sulfonyl halide is conducted preferably at a temperature between minus ten and plus sixty degrees centigrade, provided that at the lower temperature the solvent has not solidified. Thus, for pyridine, dioxane, toluene, or the like, temperatures in the range of zero to ten degrees centigrade can be used, while for benzene only temperatures above five degrees centigrade are suitable because of the relatively high melting point of benzene. The reaction time is usually between about thirty minutes and 24 hours, after which the product, 6-fluoro-11$\beta$,17$\alpha$-21-trihydroxy-4-pregnene-3,20-dione 21-alkyl or aryl sulfonate (II), is recovered in a conventional manner, such as, for example, by evaporating the solvent until a solid residue is obtained or by diluting the reaction mixture with water and precipitating the product with dilute hydrochloric acid.

The 21-iodo steroid (III) is prepared by reacting the said 21-alkyl or aryl sulfonate with an iodinating agent such as an alkali metal iodide, e. g., sodium, potassium or lithium iodide in an oxygenated hydrocarbon solution, e. g., an alkanone solution such as acetone. A molar excess of the iodide (three to twenty moles of iodide per mole of steroid) is generally preferred for this reaction. The reaction mixture containing the 21-alkyl or aryl sulfonate and the alkali metal iodide in solution is heated to reflux for a period of about three to thirty minutes. The thus produced 6-fluoro-21-iodo-11$\beta$,17$\alpha$-dihydroxy-4-pregnene-3,20-dione (III) can then be isolated by evaporating the solvent. For the subsequent reaction, the 21-iodo steroid can be used either in purified form as a product of recrystallization from such organic solvents as acetone, ethanol, or the like, or it can be employed directly as a crude product in the next step of the synthesis.

The 6-fluoro-21-iodo-11$\beta$,17$\alpha$-dihydroxy-4-pregnene-3,20-dione is dehalogenated at the 21-position by reaction with a reducing agent such as sodium or potassium thiosulfate, bisulfite or sulfite, or zinc and acetic acid, or the like. In the preferred embodiment of the invention, the crude 21-iodide is slurried with zinc and acetic acid and the mixture stirred at room temperature for a period of five minutes to two hours. After dilution with water, the product is isolated from the reaction mixture by conventional methods, such as by filtration or extraction with a water-immiscible organic solvent, e. g., ether, benzene, methylene chloride, ethylene chloride, carbon tetrachloride, chloroform, hexane, heptane, or the like, and evaporating the solvent therefrom. Purification of the thus obtained 6-fluoro-11$\beta$,17$\alpha$-dihydroxy-4-pregnene-3,20-dione can be carried out in the usual manner, such as by recrystallization from ether, acetone, methanol, ethanol, Skellysolve B (brand of hexane hydrocarbons) or the like, or by chromatography.

The foregoing procedures can likewise be conducted on the 11-keto analogues corresponding to each of the starting materials therein.

The oxidation of 6-fluoro-11$\beta$,17$\alpha$-dihydroxy-4-pregnene-3,20-dione can be carried out by a variety of methods, such as, for example, by oxidizing the said 6-fluoro-21-desoxy steroid in acetic acid solution with chromium trioxide, using molar quantities or a slight excess, or employing a haloamide or haloimide of an acid such as N-bromoacetamide, N-chlorosuccinimide, or N-bromosuccinimide in pyridine, dioxane, or other solvent solutions. After conclusion of the desired oxidation, the oxidant is generally destroyed by addition of methyl alcohol, ethyl alcohol, or the like when chromic acid is the oxidizing agent, and an alkali bisulfite when N-bromosuccinimide or other N-haloacylimides or amides are used. Thereafter, 6-fluoro-17$\alpha$-hydroxy-4-pregnene-3,11,20-trione (V) is obtained by conventional means, such as extraction with water-immiscible solvents, e. g., methylene chloride, ethylene chloride, chloroform, carbon tetrachloride, ether, benzene, toluene, or the like, or by chromatography.

As hereinbefore indicated, the compounds of the present invention are additionally useful as intermediates in the production of the valuable 9$\alpha$-fluoro derivatives by a 9$\alpha$-halogenation procedure. Thus, 6-fluoro-11$\beta$,17$\alpha$-dihydroxy-4-pregnene-3,20-dione can be dehydrated with N-bromoacetamide and anhydrous sulfur dioxide in pyridine solution by permitting the reaction to continue until a negative acidified potassium iodide-starch test of the reaction mixture is obtained. Dilution with cold water results in the precipitation of 6-fluoro-17$\alpha$-hydroxy-4,9(11)-pregnadiene-3,20-dione, which can be purified by recrystallization from acetone. The crystalline product can then be reacted in methylene chloride-tertiary butyl alcohol solution with perchloric acid and N-bromoacetamide or N-iodosuccinimide to produce a reaction mixture from which 6-fluoro-9$\alpha$-bromo-11$\beta$,17$\alpha$-dihydroxy-4-pregnene-3,20-dione or the corresponding 6-fluoro-9$\alpha$-iodo compound can be recovered by precipitation with ice water and recrystallization from acetone. The latter steroids can then be reacted in acetone solution with anhydrous potassium acetate at reflux temperatures to produce 6-fluoro-9(11)-oxido-17$\alpha$-hydroxy-4-pregnene-3,20-dione, which is recoverable from the reaction mixture by chromatography and can be further purified by recrystallization from Skellysolve B hexanes-acetone. Reaction of the said 9(11)-oxido compound in methylene chloride solution with aqueous hydrogen fluoride or hydrogen fluoride gas in the presence of tetrahydrofuran at room temperature is productive of 6,9$\alpha$-difluoro-11$\beta$,17$\alpha$-dihydroxy-4-pregnene-3,20-dione. Substitution of aqueous hydrogen chloride for the hydrogen fluoride above yields 6-fluoro-9$\alpha$-chloro-11$\beta$,17$\alpha$-dihydroxy-4-pregnene-3,20-dione. If desired, either the 9$\alpha$-fluoro or 9$\alpha$-chloro product can be oxidized, for example, with N-bromoacetamide in pyridine solution, to give 6,9$\alpha$-difluoro-17$\alpha$-hydroxy-4-pregnene-3,11,20-trione or the corresponding 9$\alpha$-chloro compound.

The steps of the foregoing process for the preparation of the 9$\alpha$-halo steroids can be inverted without departing from the basic concepts of the invention. Thus, 6-fluoro-11$\beta$,17$\alpha$-dihydroxy-21-acyloxy-4-pregnene-3,20-dione, rather than a 21-desoxy steroid, can be employed as the starting material and 9$\alpha$-halogenation accomplished as indicated above prior to deoxygenation at the 21-position. The 21-acyloxy steroid can be prepared in the manner customarily employed for acylating hydrocortisone, for example, by reaction of the appropriate 21-hydroxy steroid with the anhydride or acid halide of an organic carboxylic acid containing from one to twelve carbon atoms, inclusive, under conventional esterifying conditions. In this variation of the process, the 6-fluoro-21-acyloxy steroid can be dehydrated with N-bromoacetamide and anhydrous sulfur dioxide in pyridine as before to produce 6-fluoro-17$\alpha$-hydroxy-21-acyloxy-4,9(11)-pregnadiene-3,20-dione, which can then be reacted with N-bromoacetamide or N-iodo-succinimide in an acidic, aqueous organic solution to yield 6-fluoro-9$\alpha$-bromo-11$\beta$,17$\alpha$-dihydroxy-21-acyloxy-4-pregnene-3,20-dione or the corresponding 6-fluoro-9$\alpha$-iodo compound. The said 9$\alpha$-bromo or 9$\alpha$-iodo steroids can be reacted with anhydrous potassium acetate to give 6-fluoro-9(11)-oxido-17$\alpha$-hydroxy-21-acyloxy-4-pregnene-3,20-dione. Reaction of the 9(11)-oxido steroid with hydrogen fluoride or hydrogen chloride yields 6,9$\alpha$-difluoro-11$\beta$,17$\alpha$-dihydroxy-21-acyloxy-4-pregnene-3,20-dione or its 9$\alpha$-chloro analogue, and hydrolysis, as with potassium bicarbonate, gives the corresponding 21-hydroxy compounds. Both hydrolyzed products can then be oxidized to 11-keto steroids as before, or subjected to the reactions described herein for obtaining the 21-desoxy steroid, i. e., converting the said 6,9$\alpha$-difluoro-21-hydroxy steroid to the corresponding 21-alkyl or aryl sulfonate by reaction with an organic sulfonyl halide, obtaining therefrom the corresponding 21-iodo steroid by reaction of the said 21-alkyl or aryl sulfonate with an alkali metal iodide, and finally producing 6,9α-difluoro-11β,17α-dihydroxy-4-pregnene-3,20-dione by dehalogenating the said 21-iodo steroid with a reducing agent. If desired, the 6,9α-difluoro-21-desoxy steroid can be oxidized by reaction with chromium trioxide in acetic acid or with a haloamide or haloimide as described previously to give 6,9α-difluoro-17α-hydroxy-4-pregnene-3,11,20-trione. Alternatively, the product at any stage following introduction of the 9α-halo substituent can be oxidized, as with N-bromoacetamide in pyridine, to give the corresponding 11-keto steroid.

In the foregoing processes, it should be understood that either the 6α-halo epimer or the 6β-halo epimer can be utilized at any stage. The 6α-epimer can be obtained at appropriate intermediate stages by treatment of the 6β-compound, at temperatures of zero degrees centigrade or slightly lower and in an organic solvent such as chloroform, with an anhydrous mineral acid, such as hydrochloric acid, in the presence of alcohol. Such temperatures should be maintained throughout the period of addition of the acid. The reaction mixture can then be washed with successive portions of dilute alkali and water and evaporated under reduced pressure to obtain the 6α-epimer in high yield.

The following preparations and examples are illustrative of the process and products of the present invention but are not to be construed as limiting.

PREPARATION 1

*3-ethylene glycol ketal of methyl 3,11-diketo-5α,6α-oxido-17(20)-[cis]-pregnen-21-oate*

To a solution of five grams of the 3-ethylene glycol ketal of methyl 3,11-diketo-4,17(20)-[cis]-pregnadien-21-oate, prepared in the manner described in U. S. Patent 2,707,184, in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was then washed with a five percent aqueous solution of sodium bicarbonate and then with water. The chloroform layer was separated, dried and the solvent distilled to give a residue of 5.3 grams of solid. Crystallization of this solid from methanol gave 2.24 grams of product melting at 180 to 195 degrees centigrade, and after two crystallizations from methanol there was obtained pure 3-ethylene glycol ketal of methyl 3,11-diketo-5α,6α-oxido-17(20)-[cis]-pregnen-21-oate melting at 206 to 209 degrees centigrade and having an $[\alpha]_D$ of 37 degrees (CHCl$_3$) and the following analysis:

Calculated for $C_{24}H_{32}O_6$: C, 69.20; H, 7.75. Found: C, 69.59; H, 7.81.

PREPARATION 2

*Methyl 3,11-diketo-5α,6β-dihydroxy-17(20)-allopregnen-21-oate and methyl 3,11-diketo-5α-hydroxy-6β-fluoro-17(20)-allopregnen-21-oate*

To a solution of 1.73 grams of 3-ethylene glycol ketal of methyl 3,11-diketo-5α,6α-oxido-17(20)-[cis]-pregnen-21-oate in sixteen milliliters of methylene chloride was added six milliliters of 48 percent hydrofluoric acid. The heterogeneous mixture was stirred for two hours, made slightly basic with 300 milliliters of five percent sodium bicarbonate solution, and extracted with methylene chloride. The extract was washed, dried, and evaporated to dryness to give 1.62 grams of crude solid. Purification by chromatography gave two fractions: A, 481 milligrams eluted with methylene chloride plus five percent acetone and B, 921 milligrams eluted with methylene chloride plus ten and twenty percent acetone. Crystallization of fraction A from acetone-Skellysolve B hexanes gave 390 milligrams of methyl 3,11-diketo-5α-hydroxy-6β-fluoro-17(20)-allopregnen-21-oate, melting point 254 to 260 degrees centigrade. The analytical sample melted at 260 to 263 degrees centigrade.

*Analysis.*—Calculated for $C_{22}H_{29}O_5F$: F, 4.84. Found: F, 4.47.

Fraction B on crystallization from acetone-Skellysolve B hexanes gave 470 milligrams of methyl 3,11-diketo-5α,6β-dihydroxy-17(20)-allopregnen-21-oate, melting point 235 to 245 degrees centigrade. The analytical sample melted at 245 to 248 degrees centigrade.

*Analysis.*—Calculated for $C_{22}H_{30}O_6$: C, 67.67; H, 7.74. Found: C, 67.91; H, 7.62.

PREPARATION 3

*Methyl 3,11-diketo-5α-hydroxy-6β-fluoro-17(20)-allopregnen-21-oate 3-ethylene ketal*

A mixture of 1.9 grams of methyl 6β-fluoro-3,11-diketo-5α-hydroxy-17(20)-allopregnen-21-oate, 59 milligrams of p-toluenesulfonic acid monohydrate and 31 milliliters of distilled ethylene glycol was added to 800 milliliters of benzene. The mixture was stirred and refluxed for two hours, with the condensate passing through a water trap to remove the water. After reflux the mixture was cooled, washed with water and evaporated to dryness to give a crude solid which on recrystallization from acetone-Skellysolve B hexanes gave 1.96 grams of methyl 3,11-diketo-5α-hydroxy-6β-fluoro-17(20)-allopregnen-21-oate 3-ethylene ketal, melting point 170 to 173 degrees centigrade.

Following the above procedure, substituting other dihydric alcohols for ethylene glycol, for example, 1,2-propylene glycol, 2,3-butanediol, 1,3-butanediol and 2,3-pentanediol, is productive of the respective 3-alkylene ketals of methyl 3,11-diketo-5α-hydroxy-6β-fluoro-17(20)-allopregnen-21-oate.

PREPARATION 4

*5α,11β,21-trihydroxy-6β-fluoro-17(20)-allopregnen-3-one 3-ethylene ketal*

To a solution of 1.96 grams of methyl 3,11-diketo-5α-hydroxy-6β-fluoro-17(20)-allopregnen-21-oate 3-ethylene ketal in 850 milliliters of anhydrous ether was added 3.7 grams of lithium aluminum hydride. The mixture was stirred for a period of one hour, and 200 milliliters of water was added slowly, the ether phase separating. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give 1.30 grams of 5α,11β,21-trihydroxy-6β-fluoro-17(20)-allopregnen-3-one 3-ethylene ketal, melting point 197 to 205 degrees centigrade. An additional 226 milligrams was obtained from the mother liquor, melting point 175 to 185 degrees centigrade.

PREPARATION 5

*5α,11β-dihydroxy-6β-fluoro-21-acetoxy-17(20)-allopregnen-3-one 3-ethylene ketal*

The acetate was prepared by allowing 0.87 gram of 5α,11β,21-trihydroxy-6β-fluoro-17(20)-allopregnen-3-one 3-ethylene ketal to stand overnight in ten milliliters of acetic anhydride and ten milliliters of pyridine. The solution was then poured into ice water to give 0.92 gram of 5α,11β-dihydroxy-6β-fluoro-21-acetoxy-17(20)-allopregnen-3-one 3-ethylene ketal, melting point 140 to 150 degrees centigrade, which on recrystallization from acetone-Skellysolve B hexanes gave 0.77 gram, melting point 149 to 153 degrees centigrade.

Similarly, other 21-organic carboxylic esters of 5α,11β,21-trihydroxy-6β-fluoro-17(20)-allopregnen-3-one 3-ethylene ketals can be prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting $5\alpha,11\beta,21$-trihydroxy - $6\beta$ - fluoro-17(20)-allopregnen-3-one 3-ethylene ketal with the appropriate acylating agent, e. g., the anhydride or acid halide of the selected acid in a solvent such as benzene, toluene, acetic acid, or the like.

PREPARATION 6

$5\alpha,11\beta,17\alpha$ - trihydroxy - $6\beta$-fluoro - 21-acetoxy-allopregnane-3,20-dione 3-ethylene ketal To a solution of 0.77 gram of $5\alpha,11\beta$-dihydroxy-$6\beta$-fluoro - 21 - acetoxy - 17(20)-allopregnen-3-one 3-ethylene ketal in 35 milliliters of tertiary butyl alcohol was added one milliliter of pyridine, 1.9 milliliters of N-methylmorpholine oxide peroxide solution, and 13.1 milligrams of osmium tetroxide (9.1 milliliters of tertiary butyl alcohol solution containing 1.44 milligrams osmium tetroxide per milliliter). The solution was stirred for a period of 2.5 hours and fifteen milliliters of five percent sodium hydrosulfite was added. Stirring was continued for an additional ten minutes, at which time 0.7 gram of finely ground synthetic magnesium silicate was mixed into the solution for a period of twenty minutes and then removed by filtration. The filtrate was evaporated to dryness under reduced pressure at a temperature of less than fifty degrees centigrade. The residue was dissolved in methylene chloride, washed with water, dried and evaporated to dryness. The residue was crystallized from acetone-Skellysolve B hexanes to give 0.47 gram of $5\alpha,11\beta,17\alpha$-trihydroxy - $6\beta$-fluoro-21-acetoxyallopregnane-3,20-dione 3-ethylene ketal, melting point 220 to 228 degrees centigrade.

PREPARATION 7

$5\alpha,11\beta,17\alpha$-trihydroxy-$6\beta$-fluoro-21-acetoxy-allopregnane-3,20-dione A solution of 0.47 gram of $5\alpha,11\beta,17\alpha$-trihydroxy-$6\beta$-fluoro-21-acetoxyallopregnane-3,20-dione 3-ethylene ketal in 35 milliliters of acetone and four milliliters of 1 N sulfuric acid solution was gently boiled on a steam bath for ten minutes, cooled and neutralized with dilute sodium bicarbonate solution. Addition of water followed by cooling gave 0.33 gram of $5\alpha,11\beta,17\alpha$-trihydroxy-$6\beta$-fluoro-21-acetoxyallopregnane-3,20-dione, melting point 230 to 240 degrees centigrade.

PREPARATION 8

$6\beta$-fluoro-$11\beta,17\alpha$-dihydroxy-21-acetoxy-4-pregnene-3,20-dione ($6\beta$-fluorohydrocortisone acetate)

A solution of 100 milligrams of $5\alpha,11\beta,17\alpha$-trihydroxy-$6\beta$-fluoro-21-acetoxyallopregnane-3,20-dione in 4.9 milliliters of acetic acid and 0.1 milliliter of water was refluxed for a period of one hour, cooled, diluted with fifty milliliters of water and evaporated to dryness under reduced pressure. The residue was chromatographed over synthetic magnesium silicate to give one fraction (77 milligrams) eluted with methylene chloride plus ten percent acetone. Crystallization from acetone-Skellysolve B hexanes gave 38 milligrams of $6\beta$-fluoro-$11\beta,17\alpha$-dihydroxy-21-acetoxy-4-pregnene-3,20-dione ($6\beta$-fluorohydrocortisone acetate), melting point 210 to 218 degrees centigrade. Infrared data and ultraviolet data were in agreement with the structure.

PREPARATION 9

$6\alpha$-fluoro-$11\beta,17\alpha$-dihydroxy-21-acetoxy-4-pregnene-3,20-dione ($6\alpha$-fluorohydrocortisone acetate)

A solution of 0.132 gram of $6\beta$-fluoro-$11\beta,17\alpha$-dihydroxy-21-acetoxy-4-pregnene-3,20-dione in twelve milliliters of chloroform and 0.1 milliliter of absolute alcohol was cooled to minus ten degrees centigrade in an ice-salt bath. A stream of anhydrous hydrochloric acid was gently bubbled through the solution for 2½ hours, during which period the temperature was maintained between minus five and minus fifteen degrees centigrade. The solution was then diluted with 25 milliliters of chloroform, washed with dilute aqueous sodium bicarbonate solution, dried over anhydrous sodium sulfate, and evaporated to dryness under reduced pressure at sixty degrees centigrade. Crystallization of the residue from acetone-Skellysolve B hexanes gave 42 milligrams of the isomerized product, $6\alpha$-fluoro-$11\beta,17\alpha$-dihydroxy-21-acetoxy-4-pregnene-3,20-dione, which melted at 203 to 210 degrees centigrade.

PREPARATION 10

$6\alpha$-fluoro-$11\beta,17\alpha,21$-trihydroxy-4-pregnene-3,20-dione ($6\alpha$-fluorohydrocortisone)

A solution of 1.1 grams of $6\alpha$-fluoro-$11\beta,17\alpha$-dihydroxy-21-acetoxy-4-pregnene-3,20-dione, one gram of potassium bicarbonate, 100 milliliters of methanol and fifteen milliliters of water were mixed together and purged with nitrogen to remove dissolved oxygen while stirring at 25 degrees centigrade for four hours. The solution was then neutralized by addition of acetic acid and distilled under vacuum to remove the methanol. The residue was extracted with 100 milliliters of methylene dichloride, and the extract was dried over sodium sulfate and passed through a column containing eighty grams of synthetic magnesium silicate. The fraction eluted with Skellysolve B hexanes plus twenty and thirty percent acetone weighed 770 milligrams, representing a yield of 77.5 percent. Recrystallization of a portion of this crude product from ethyl acetate-Skellysolve B hexanes gave crystals melting at 192 to 195 degrees centigrade.

Substituting the $6\beta$-fluorohydrocortisone acetate from Preparation 8 for the starting material above, there is produced $6\beta$-fluorohydrocortisone.

PREPARATION 11

$6\beta$-fluoro-$17\alpha,21$-dihydroxy-4-pregnene-3,11,20-trione ($6\beta$-fluorocortisone)

To a solution of 0.5 gram of $6\beta$-fluoro-$11\beta,17\alpha,21$-trihydroxy-4-pregnene-3,20-dione and one milliliter of pyridine in 35 milliliters of tertiary butyl alcohol was added 250 milligrams of N-bromoacetamide. After maintaining at room temperature for sixteen hours, the reaction mixture was diluted with 25 milliliters of water containing 250 milligrams of sodium sulfite and concentrated to about twenty milliliters, at which point precipitation occurred. The thus obtained precipitate was collected on a filter and recrystallized three times from ethyl acetate and Skellysolve B hexanes to give $6\beta$-fluoro-$17\alpha,21$-dihydroxy-4-pregnene-3,11,20-trione.

Substitution of the corresponding $6\alpha$-epimer for the starting material above is productive of $6\alpha$-fluoro-$17\alpha,21$-dihydroxy-4-pregnene-3,11,20-trione. Alternatively, the $6\alpha$-epimer can be obtained from the corresponding $6\beta$ product by the procedure of Preparation 9.

EXAMPLE 1

$6\alpha$-fluoro-$11\beta,17\alpha,21$-trihydroxy-4-pregnene-3,20-dione 21-methanesulfonate (II)

To a solution of 770 milligrams of crude $6\alpha$-fluoro-$11\beta,17\alpha,21$-trihydroxy-4-pregnene-3,20-dione ($6\alpha$-fluorohydrocortisone) (I) in ten milliliters of pyridine previously cooled to zero to five degrees centigrade there was added 0.7 milliliter of methanesulfonyl chloride. The reaction mixture was stirred in an ice-water bath for four hours. Dilution with 100 milliliters of five percent hydrochloric acid precipitated the crystalline mesylate II. The product, after filtration, weighed 900 milligrams and melted at 189 to 192 degrees (with decomposition). Infrared analysis in mineral oil mull showed adsorptions as follows: 3560, 3420 centimeters$^{-1}$ (OH); 1725 centimeters$^{-1}$ (20-ketone); 1655 centimeters$^{-1}$ ($\Delta^4$-3-ketone); 1640, 1617 centimeters$^{-1}$ (C=C); 1350, 1200, 1170 centimeters$^{-1}$ (—OSO$_2$—).

EXAMPLE 2

*6α-fluoro-21-iodo-11β,17α-dihydroxy-4-pregnene-3,20-dione (III)*

A mixture of 200 milligrams of crude mesylate (II) and 200 milligrams of sodium iodide in ten milliliters of acetone was heated under reflux for fifteen minutes. The solvent was distilled under vacuum, and the resulting 6α-fluoro-21-iodo-11β,17α-dihydroxy-4-pregnene-3,20-dione (III) was not purified but was employed in the crude state in the succeeding step of Example 3.

Recrystallization from methylene chloride gives the product (III) in high purity.

EXAMPLE 3

*6α-fluoro-11β,17α-dihydroxy-4-pregnene-3,20-dione (IV)*

The crude product from Example 2 above (III) was dissolved in four milliliters of acetic acid. After stirring continuously at room temperature for thirty minutes, sufficient five percent sodium thiosulfate solution was added to discharge the iodine color. The resulting colorless solution was poured into 100 milliliters of water containing five grams of potassium bicarbonate. On filtering the resulting crystals, 140 milligrams of crystalline product melting at 155 to 195 degrees centigrade was obtained. Several recrystallizations from ethyl acetate yielded a product melting at 219 to 222 degrees centigrade. This product was identified as 6α-fluoro-11β,17α-dihydroxy-4-pregnene-3,20-dione IV, with infrared adsorptions as follows: 3590, 3380 centimeters$^{-1}$ (OH); 1697 centimeters$^{-1}$ (20-ketone); 1665 centimeters$^{-1}$ (conjugated ketone); 1623 centimeters$^{-1}$ (C=C). Analysis was as follows:

Calculated for C$_{21}$H$_{29}$FO$_4$: C, 69.20; H, 8.02; F, 5.21. Found: C, 69.59; H, 8.09; F, 3.97.

EXAMPLE 4

*6α-fluoro-17α-hydroxy-4-pregnene-3,11,20-trione (V)*

A mixture is prepared containing 0.5 gram of 6α-fluoro-11β,17α-dihydroxy-4-pregnene-3,20-dione (IV), 0.15 gram of chromium trioxide, ten milliliters of glacial acetic acid and one-half milliliter of water. This mixture is stirred and maintained for eight hours at room temperature. Thereafter the mixture is poured into fifty milliliters of ice water, neutralized by the addition of dilute sodium hydroxide, and the resulting precipitate collected on a filter and recrystallized from ethyl acetate-Skellysolve B hexanes to give 6α-fluoro-17α-hydroxy-4-pregnene-3,11,20-trione (V).

EXAMPLE 5

*6α-fluoro-17α,21-dihydroxy-4-pregnene-3,11,20-trione 21-methanesulfonate*

Following the procedure of Example 1, reaction of one gram of 6α-fluorocortisone in seven milliliters of pyridine with 0.3 milliliter of methanesulfonyl chloride in pyridine solution yields 6α-fluoro-17α,21-dihydroxy-4-pregnene-3,11,20-trione 21-methanesulfonate.

EXAMPLE 6

*6α-fluoro-17α-hydroxy-21-iodo-4-pregnene-3,11,20-trione*

Following the procedure of Example 2, reaction of the 21-methanesulfonate from Example 5 with sodium iodide in acetone is productive of 6α-fluoro-17α-hydroxy-21-iodo-4-pregnene-3,11,20-trione.

EXAMPLE 7

*6α-fluoro-17α-hydroxy-4-pregnene-3,11,20-trione*

Crude 6α-fluoro-21-iodo-17α-hydroxy-4-pregnene-3,11,20-trione from Example 6 is slurried with fifteen milliliters of acetic acid and stirred for a period of 45 minutes. Thereafter one gram of zinc dust is added and stirring continued for an additional fifteen minutes. The excess zinc dust is removed by filtration, and the filtrate is diluted with methylene chloride and washed with water in cold sodium bicarbonate solution until all the acetic acid is neutralized. After drying over anhydrous sodium sulfate, the solution is chromatographed over synthetic magnesium silicate. Recrystallization from acetone-Skellysolve B hexanes is productive of essentially pure 6α-fluoro-17α-hydroxy-4-pregnene-3,11,20-trione.

EXAMPLE 8

*6β-epimers*

Substitution of the 6β-epimers for the starting materials in each of the preceding examples and maintaining near neutral reaction conditions is productive of the corresponding 6β-products, including 6β-fluoro-11β,17α,21-trihydroxy-4-pregnene-3,20-dione 21-methanesulfonate, 6β-fluoro-21-iodo-11β,17α-dihydroxy-4-pregnene-3,20-dione, 6β-fluoro-11β,17α-dihydroxy-4-pregnene-3,20-dione, and 6β-fluoro-17α-hydroxy-4-pregnene-3,11,20-trione.

It is to be understood that the present invention is not to be limited to the exact details of operation or exact compounds shown and described, as obvious modifications and equivalents will be apparent to one skilled in the art. The invention is therefore to be limited only by the scope of the appended claims.

We claim:

1. A compound selected from the group consisting of 6-fluoro-11β,17α-dihydroxy-4-pregnene-3,20-dione and 6-fluoro-17α-hydroxy-4-pregnene-3,11,20-trione.
2. 6-fluoro-11β,17α-dihydroxy-4-pregnene-3,20-dione.
3. 6α-fluoro-11β,17α-dihydroxy-4-pregnene-3,20-dione.
4. 6-fluoro-17α-hydroxy-4-pregnene-3,11,20-trione.
5. 6α-fluoro-17α-hydroxy-4-pregnene-3,11,20-trione.
6. A compound of the formula

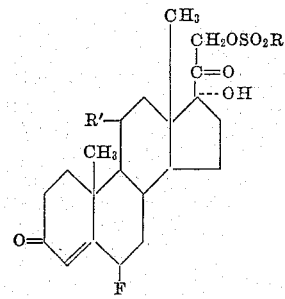

wherein R is a hydrocarbon radical containing from one to ten carbon atoms, inclusive, and R' is a member selected from the group consisting of hydroxy and keto.

7. 6α-fluoro-11β,17α,21-trihydroxy-4-pregnene-3,20-dione 21-methanesulfonate.

8. A compound selected from the group consisting of 6-fluoro-21-iodo-11β,17α-dihydroxy-4-pregnene-3,20-dione and 6-fluoro-21-iodo-17α-hydroxy-4-pregnene-3,11,20-trione.

9. 6α-fluoro-21-iodo-11β,17α-dihydroxy-4-pregnene-3,20-dione.

10. A process for the production of 6-fluoro steroids which comprises: treating a compound of the formula

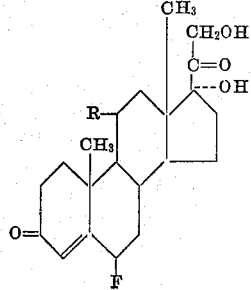

wherein R is a member selected from the group consisting of hydroxy and keto, with an organic sulfonyl halide to give the corresponding 21-organic sulfonate, reacting the said 21-organic sulfonate with an iodinating agent to produce the corresponding 21-iodo steroid, and dehalogenating the said 21-iodo steroid with a reducing agent to produce the corresponding 6-fluoro-11-oxygenated-17α-hydroxy-4-pregnene-3,20-dione.

11. A process for the production of 6-fluoro-11β,17α-dihydroxy-4-pregnene-3,20-dione which comprises: treating 6-fluoro-11β,17α,21-trihydroxy-4-pregnene-3,20-dione with an organic sulfonyl halide to give the corresponding 21-organic sulfonate, reacting the said 21-organic sulfonate with an iodinating agent to give the corresponding 21-iodo steroid, and dehalogenating the said 21-iodo steroid with a reducing agent to produce 6-fluoro-11β,17α-dihydroxy-4-pregnene-3,20-dione.

12. A process for the production of 6α-fluoro-11β,17α-dihydroxy-4-pregnene-3,20-dione which comprises: treating 6α-fluoro-11β,17α,21-trihydroxy-4-pregnene-3,20-dione with methanesulfonyl chloride to give the corresponding 21-methanesulfonate, reacting the said 21-methanesulfonate with an alkali metal iodide to give the corresponding 21-iodo steroid, and dehalogenating the said 21-iodo steroid with zinc and acetic acid to produce 6α-fluoro-11β,17α-dihydroxy-4-pregnene-3,20-dione.

13. A process for the production of 6α-fluoro-17α-hydroxy-4-pregnene-3,11,20-trione which comprises: treating 6α-fluoro-11β,17α,21-trihydroxy-4-pregnene-3,20-dione with an organic sulfonyl halide to give the corresponding 21-organic sulfonate, reacting the said 21-organic sulfonate with an iodinating agent to give the corresponding 21-iodo steroid, dehalogenating the said 21-iodo steroid with a reducing agent to produce the corresponding 21-desoxy steroid, and oxidizing the said 21-desoxy steroid to produce 6α-fluoro-17α-hydroxy-4-pregnene-3,11,20-trione.

14. A process for the production of 6α-fluoro-17α-hydroxy-4-pregnene-3,11,20-trione which comprises: treating 6α-fluoro-11β,17α,21-trihydroxy-4-pregnene-3,20-dione with methanesulfonyl chloride to give the corresponding 21-methanesulfonate, reacting the said 21-methanesulfonate with an alkali metal iodide to give the corresponding 21-iodo steroid, dehalogenating the said 21-iodo steroid with zinc and acetic acid to produce the corresponding 21-desoxy steroid, and oxidizing the said 21-desoxy steroid with chromic acid and acetic acid to give 6α-fluoro-17α-hydroxy-4-pregnene-3,11,20-trione.

15. A process for the production of a compound of the following formula:

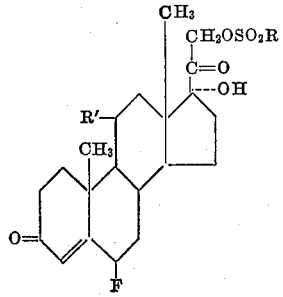

wherein R is the acid radical of an organic carboxylic acid containing from one to ten carbon atoms, inclusive, and R' is a member selected from the group consisting of hydroxy and keto, which comprises: reacting 6-fluoro-11-oxygenated-17α,21-dihydroxy-4-pregnene-3,20-dione with an organic sulfonyl halide.

16. A process for the production of 6α-fluoro-11β,17α,21-trihydroxy-4-pregnene-3,20-dione 21-methanesulfonate which comprises: reacting 6α-fluoro-11β,17α,21-trihydroxy-4-pregnene-3,20-dione with methanesulfonyl chloride.

17. A process for the production of a compound of the following formula:

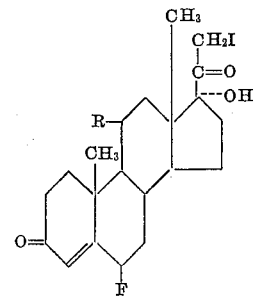

wherein R is a member selected from the group consisting of hydroxy and keto, which comprises: reacting 6-fluoro-11-oxygenated-17α,21-dihydroxy-4-pregnene-3,20-dione 21-organic sulfonate with an iodinating agent.

18. A process for the production of 6α-fluoro-11β,17α-dihydroxy-21-iodo-4-pregnene-3,20-dione which comprises: reacting 6α-fluoro-11β,17α,21-trihydroxy-4-pregnene-3,20-dione 21-methanesulfonate with an alkali metal iodide.

19. A process for the production of 6-fluoro-11-oxygenated-17α-hydroxy-4-pregnene-3,20-dione which comprises: dehalogenating 6-fluoro-11-oxygenated-17α-hydroxy-21-iodo-4-pregnene-3,20-dione with a reducing agent.

20. A process for the production of 6α-fluoro-11β,17α-dihydroxy-4-pregnene-3,20-dione which comprises: dehalogenating 6α-fluoro-11β,17α-dihydroxy-21-iodo-4-pregnene-3,20-dione with zinc and acetic acid.

21. A process for the production of 6-fluoro-17α-hydroxy-4-pregnene-3,11,20-trione which comprises: oxidizing 6-fluoro-11β,17α-dihydroxy-4-pregnene-3,20-dione with an oxidizing agent.

22. A process for the production of 6α-fluoro-17α-hydroxy-4-pregnene-3,11,20-trione which comprises: oxidizing 6α-fluoro-11β,17α-dihydroxy-4-pregnene-3,20-dione with a member selected from the group consisting of N-haloamides, N-haloimides and chromium trioxide.

References Cited in the file of this patent
UNITED STATES PATENTS

| | | |
|---|---|---|
| 2,332,815 | Ruzicka | Oct. 26, 1943 |
| 2,705,237 | Djerassi et al. | Mar. 29, 1955 |
| 2,816,902 | Gould et al. | Dec. 17, 1957 |
| 2,819,264 | Gould et al. | Jan. 7, 1958 |